July 11, 1961 J. H. GILSON ET AL 2,992,042
VEHICLE CLOSURE
Filed Oct. 17, 1957 7 Sheets-Sheet 5

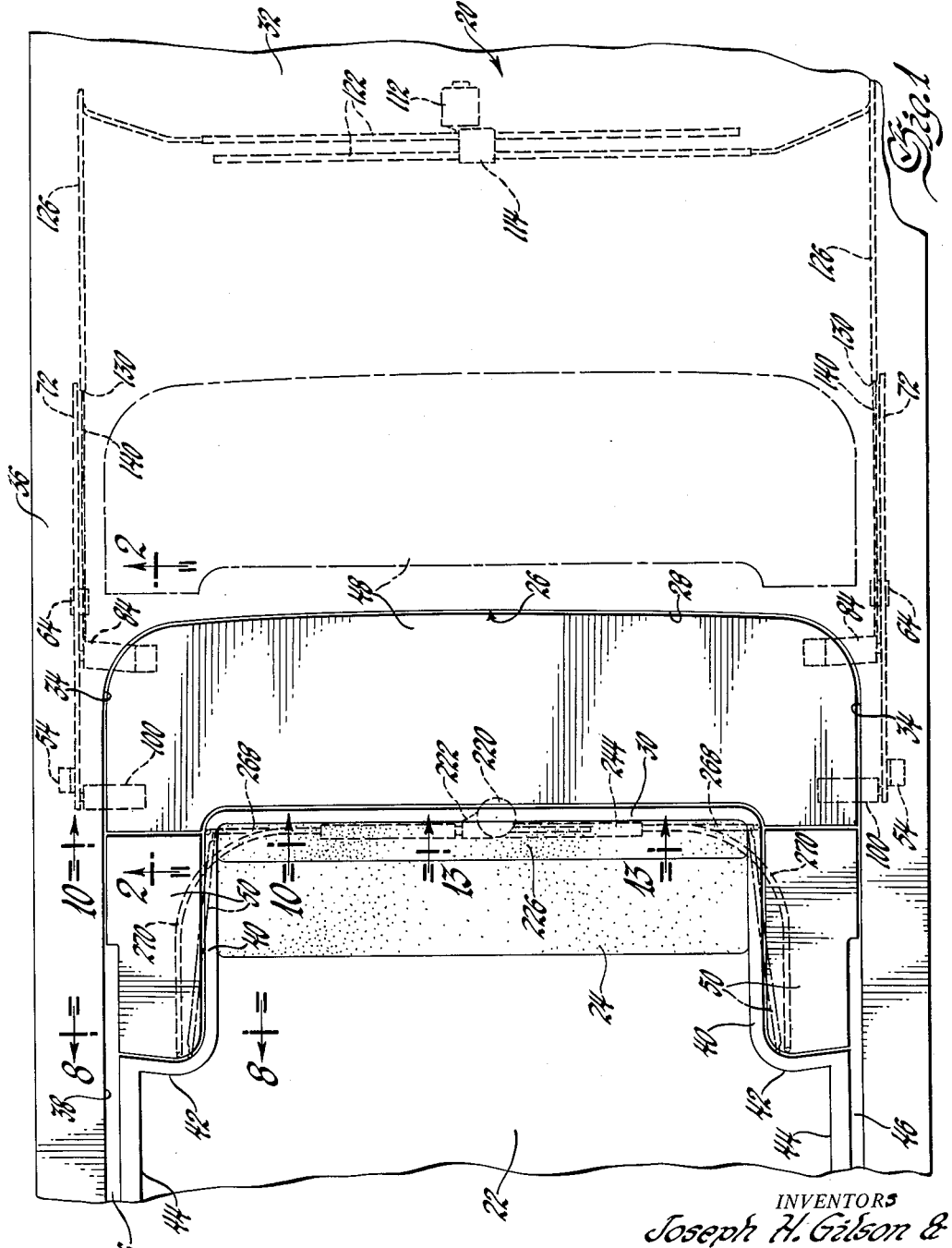

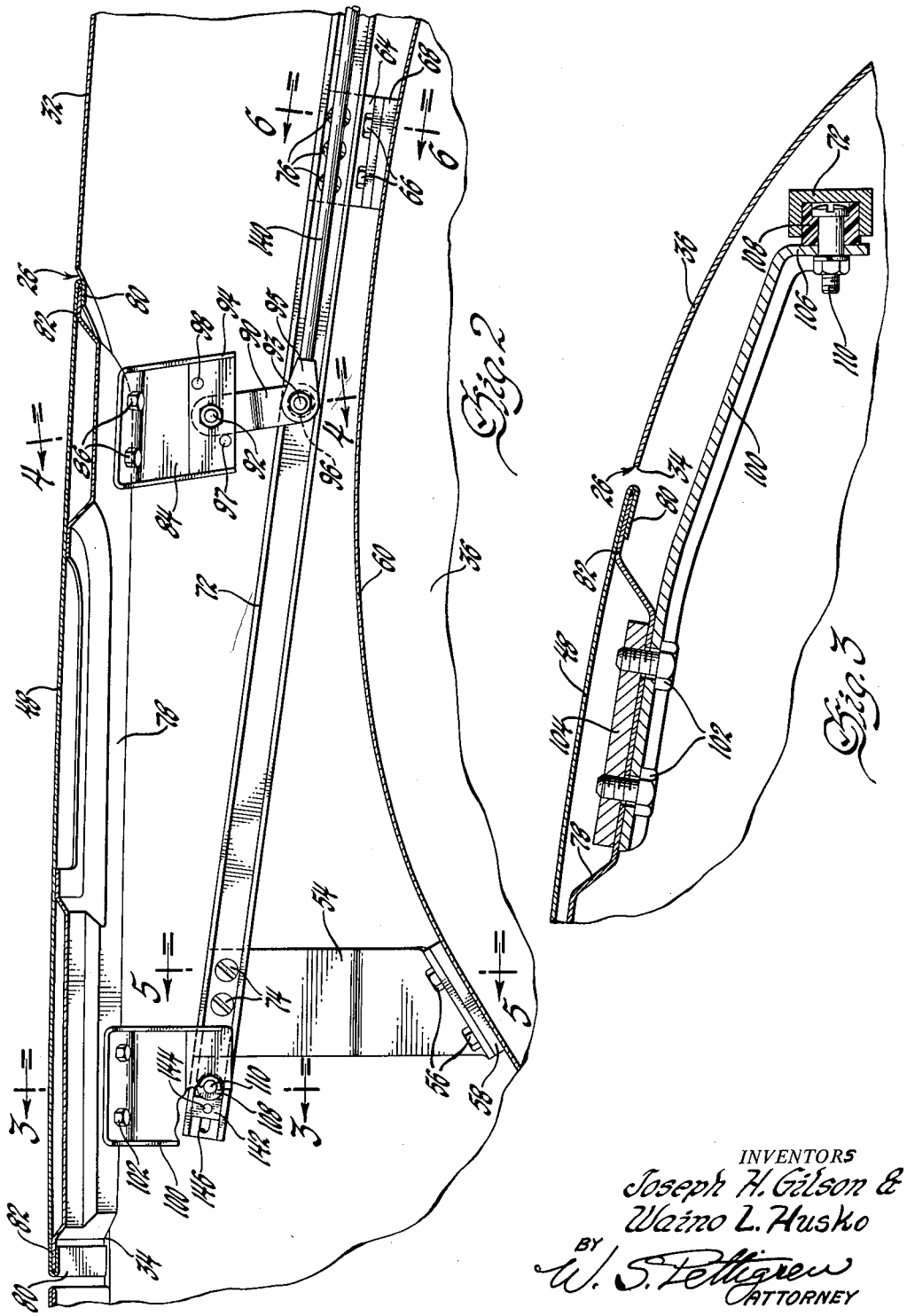

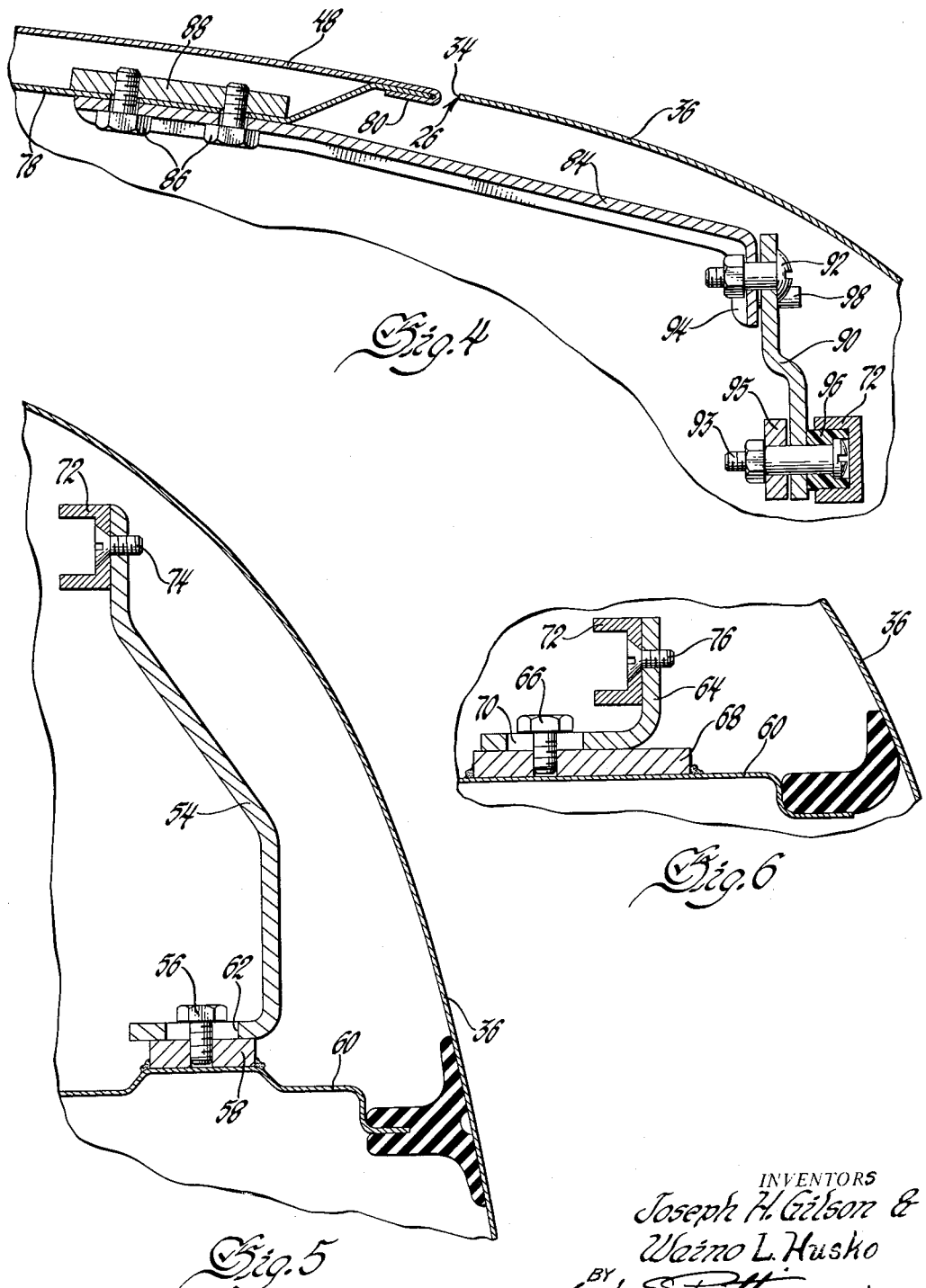

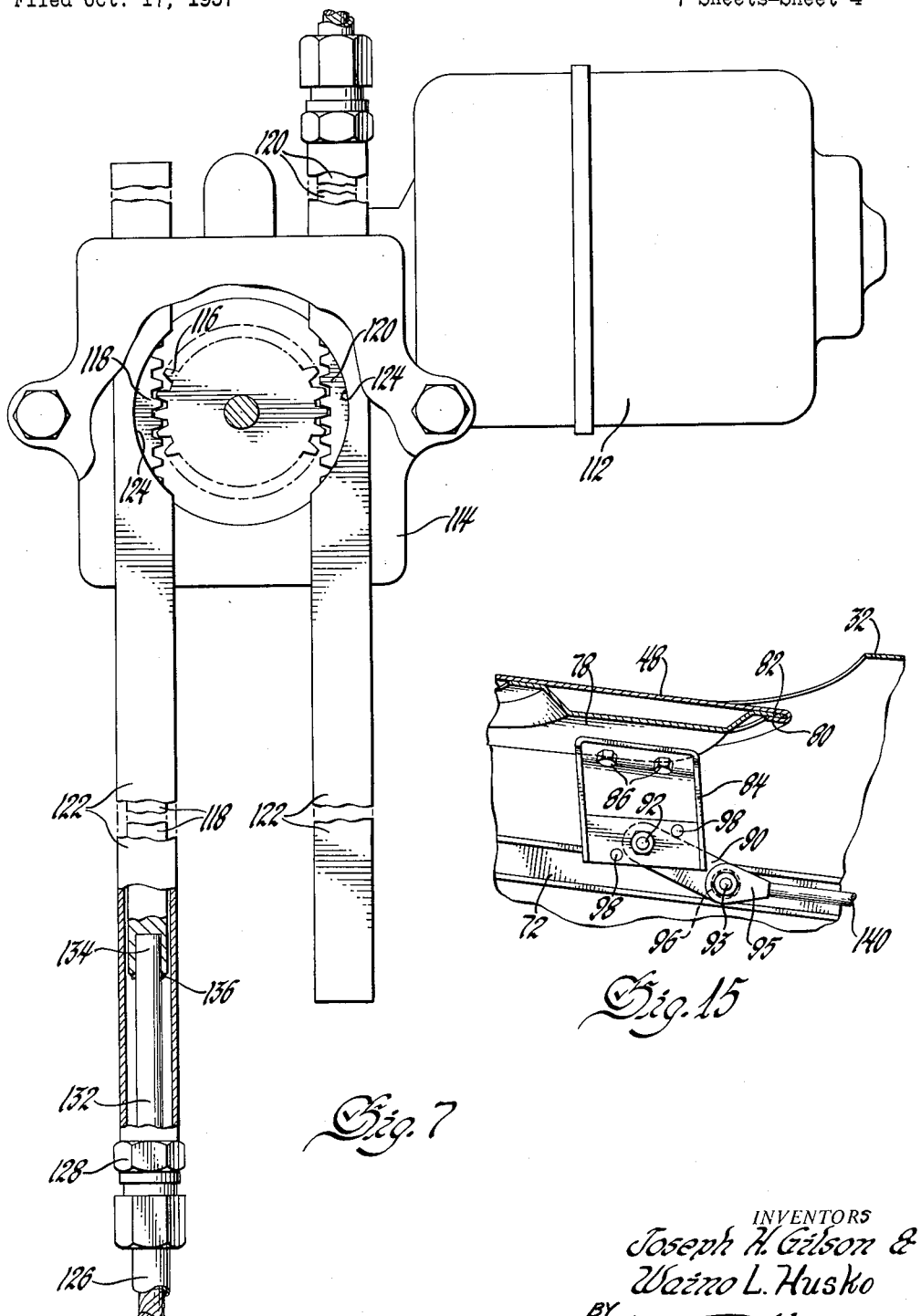

INVENTORS
Joseph H. Gilson &
Waino L. Husko
BY W. S. Pettigrew
ATTORNEY

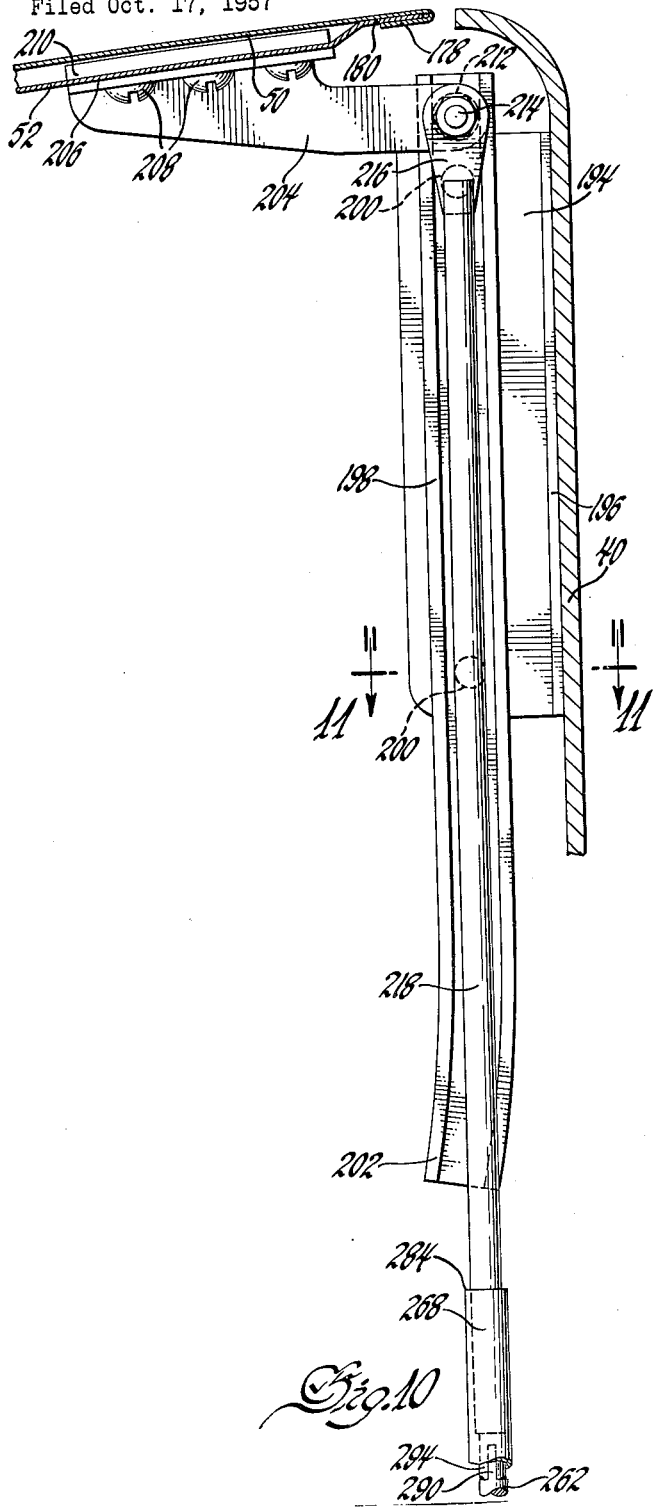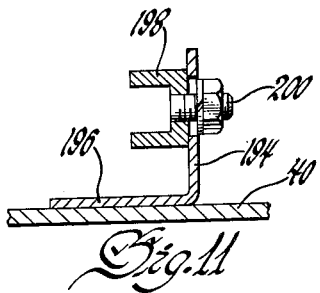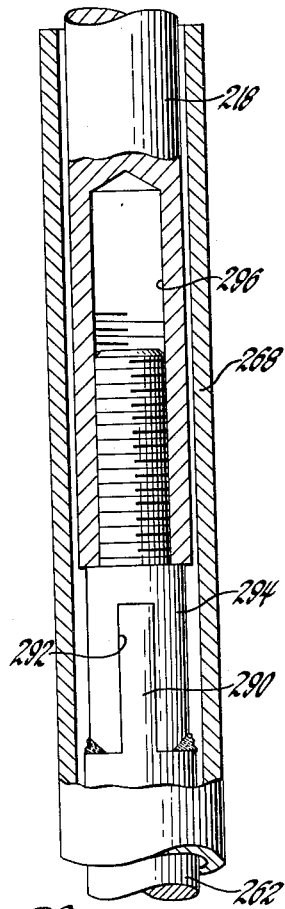

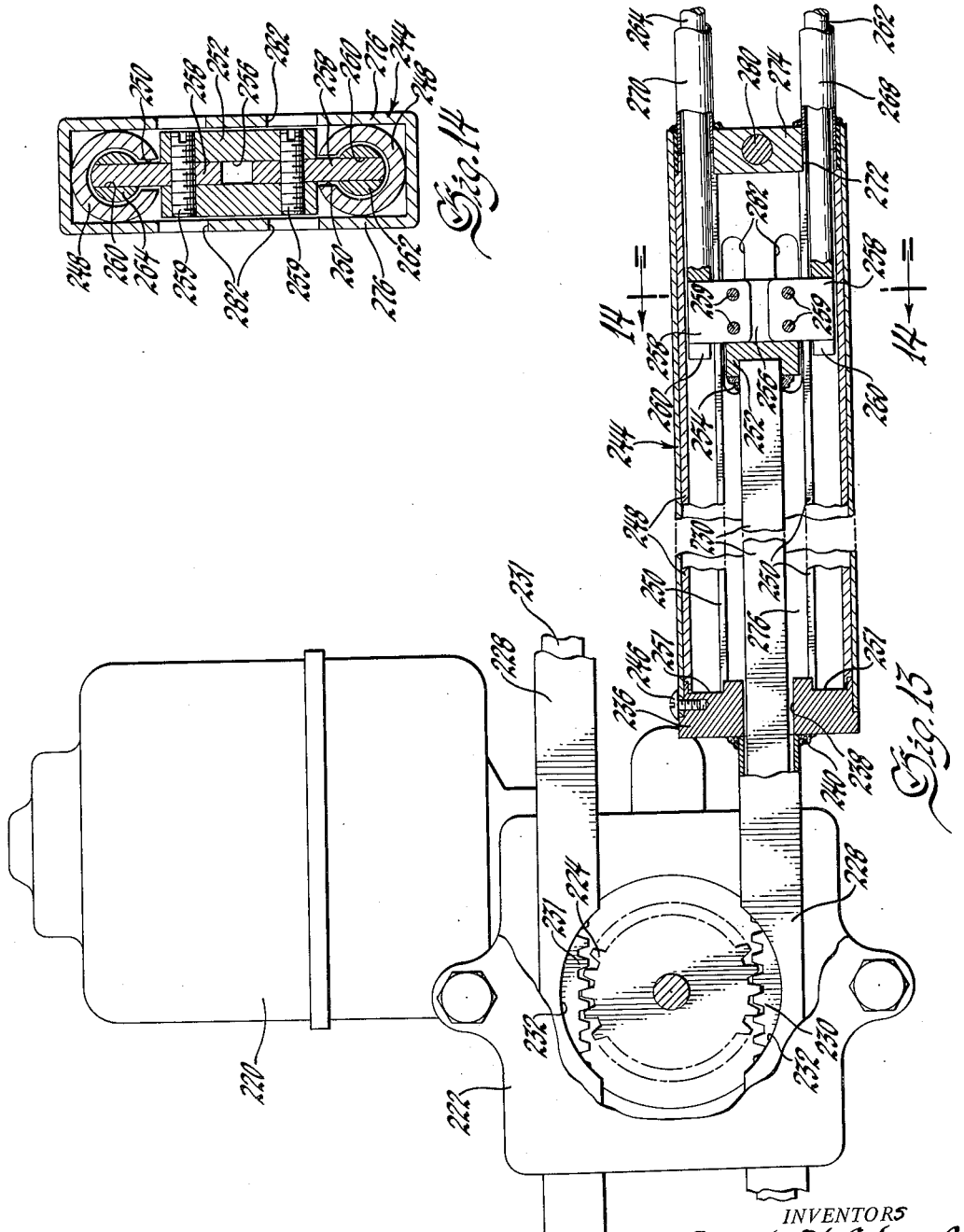

United States Patent Office 2,992,042
Patented July 11, 1961

2,992,042
VEHICLE CLOSURE
Joseph H. Gilson, Warren, and Waino L. Husko, Detroit, Mich., assignors to General Motors Corporation, Detroit, Mich., a corporation of Delaware
Filed Oct. 17, 1957, Ser. No. 690,771
2 Claims. (Cl. 296—136)

This invention relates to vehicle closures and more particularly to convertible top well closures.

The modern convertible type vehicle body usually includes a top well which receives the folded top in lowered position to store the top within the body out of sight when not in use. The top well is generally of U-shape and is usually located to either side and to the rear of the passenger compartment. In the usual two seat type of convertible vehicle body the top well is located to the rear and to either side of the rear passenger seat.

When the top is in raised position it usually covers the opening of the top well and seals to the body around the outer wall of the well. However, when the top is in stored position within the well the opening of the well is not covered by the top and some type of closure must therefore be provided for the opening of the top well. In the past, many types of closures have been provided for the opening of the top well, and perhaps the most common type of closure is a fabric or canvas boot which is buttoned or otherwise secured to the body around the opening of the well. Another more common type of closure is a series of generally flexible or semi-rigid cover panels which are secured to each other and also to the body around the opening of the top well. However, both of these types of closures have several disadanvtages. One important disadvantage is that each must be manually removed by the operator prior to raising of the top and also must be manually secured to the body around the top well after the top has been moved within the well. This requires the operator to leave his seat and to exert manual effort whenever he wishes to raise or lower the top. Another disadvantage is that each type of closure often projects above the adjacent body contour when in place over the top well so that there is a very noticeable bulge or interruption in the upper body contour which may detract from the overall appearance of the vehicle.

The top well closure of this invention serves to adequately close the opening of the top well when the top is in lowered position and is also movable to a stored out-of-the-way position within the body when the top is in raised position. In addition, the closure of this invention overcomes the several disadvantages of the more common types of top well closures. In its preferred embodiment, the closure generally includes a series of three panels, a rear panel which closes the portion of the top well opening to the rear of the passenger compartment and a pair of side panels which close the portions of the top well opening to the sides of the passenger compartment. Each of the panels is power operated for movement between opened and closed positions and is stored within the body when in open position without interfering in any manner with the movement of the top structure between raised and lowered positions. In addition, each of the panels fits flush with the adjacent panel when in closed position and also fits flush with and continues the general contour of the adjacent upper body surface. Thus, the top well closure of this invention does not require the operator to leave his seat or to exert any manual effort in order to open and close the opening of the top well. In addition, the upper body surface presents a continuous contoured surface when the top is in stored position so as to increase the aesthetic appearance of the body.

The primary object of this invention is to provide a new and improved convertible top well closure. Another object of this invention is to provide a new and improved convertible top well closure including a number of panels which are easily moved between open and closed positions and are stored within the body when in open position and not in use. A further object of this invention is to provide a new and improved convertible top well closure including a number of panels which are easily movable between open and closed positions without requiring the operator of the vehicle to leave his seat or exert any manual effort. Yet another object of this invention is to provide a new and improved convertible top well closure including a number of panels which adequately serve to close the opening of the top well and fit flush with the adjacent body surface when in closed position so as to provide a continuation of the adjacent body surface without any interruptions.

These and other objects of this invention will be readily apparent from the following specification and drawings wherein:

FIGURE 1 is a partial top plan view of a convertible type vehicle body embodying a top well closure according to this invention.

FIGURE 2 is an enlarged sectional view, partially broken away, taken on the plane indicated on line 2—2 of FIGURE 1.

FIGURE 3 is an enlarged sectional view taken on the plane indicated by line 3—3 of FIGURE 2.

FIGURE 4 is an enlarged sectional view taken on the plane indicated by line 4—4 of FIGURE 2.

FIGURE 5 is an enlarged sectional view taken on the plane indicated by line 5—5 of FIGURE 2.

FIGURE 6 is an enlarged sectional view taken on the plane indicated by line 6—6 of FIGURE 2.

FIGURE 7 is an enlarged view, partially in section, showing the power operating means for the rear panel of the top well closure.

FIGURE 10 is an enlarged sectional view taken on the plane indicated by line 10—10 of FIGURE 1.

FIGURE 11 is a sectional view taken on the plane indicated by line 11—11 of FIGURE 10.

FIGURE 12 is an enlarged view, partially in section, of a portion of FIGURE 10.

FIGURE 13 is an enlarged view, partially in section, taken along the plane indicated by line 13—13 of FIGURE 1.

FIGURE 14 is an enlarged sectional view taken on the plane indicated by line 14—14 of FIGURE 13; and FIGURE 15 is an enlarged view of a portion of the rear panel when in open position.

Figure 8:
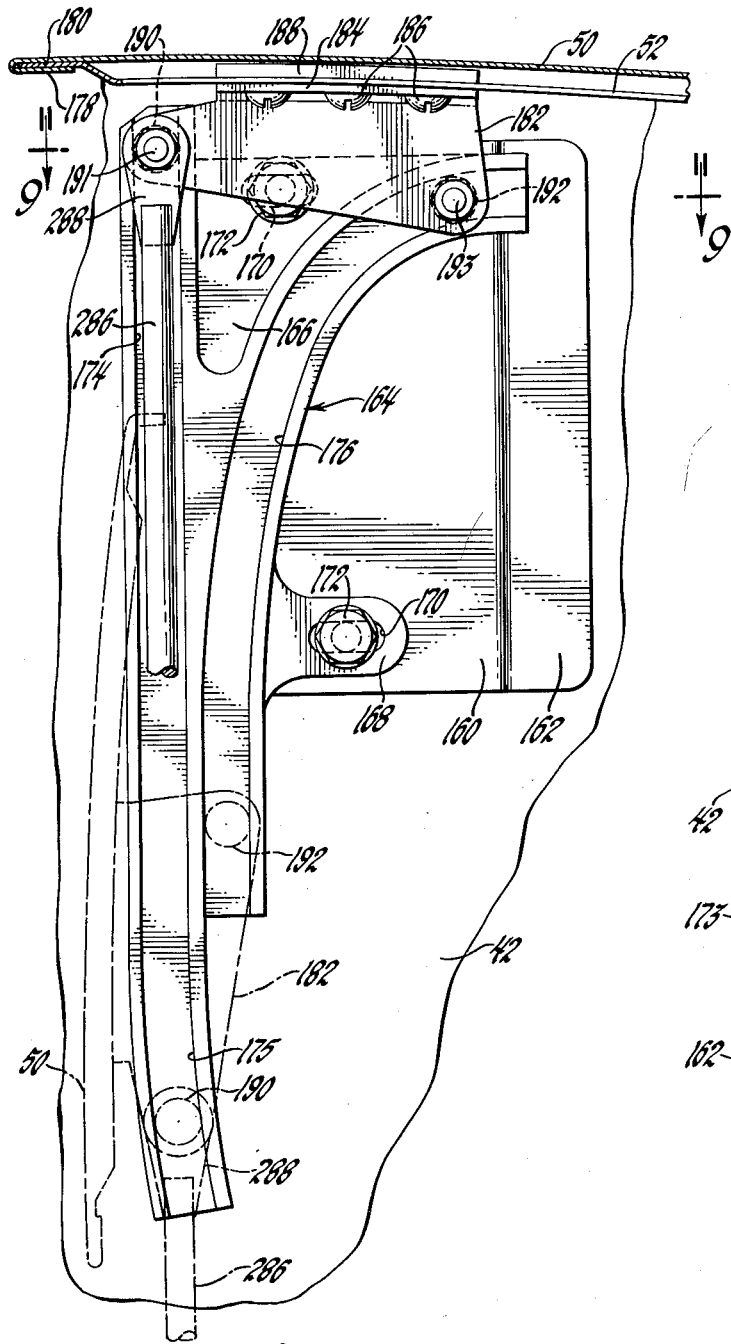
FIGURE 8 is an enlarged sectional view taken on the plane indicated by line 8—8 of FIGURE 1.

Referring now particularly to FIGURE 1 of the drawings, a convertible type vehicle body 20 includes a passenger compartment 22 having a rear passenger seat 24. The usual top storage well of generally U-shape is located to the rear and to the sides of the rear seat 24. The opening 26 of the well generally comprises a first portion 28 located rearwardly of seat 24 and having its forward and rearward edges defined by a rear wall 30 of the passenger compartment and the forward edge of the rear deck 32 of the body, with the sides of the portion 28 being defined by the upper edges 34 of the outer body walls 36. The opening 26 of the well also includes a pair of portions 38 located to either side of seat 24 and extending longitudinally forwardly of the body from either end of the portion 28 of the opening. The portions 38 of the opening have their opposite side edges defined by the upper edges 34 of the outer body walls 36 and by passenger compartment walls 40 to either side of the rear seat 24. Walls 40 include outwardly extending portions 42 which define the forward edges of portions 38 of the opening and are joined to forwardly extending wall portions 44. Wall portions 44 are spaced from the edges 34 of walls 36 to provide openings 46. The openings 46 allow the rear quarter vehicle windows (not shown) to be moved between open and closed positions.

The well closure of this invention generally comprises a rear panel or section 48 providing a closure for the portion 28 of the opening 26 of the top well when in closed position and a pair of like side panels or sections 50 which provide closures for the portions 38 of the opening of the top well when in closed position. Although not shown in the drawings, it will be understood, of course, that a convertible top structure is mounted within the well in a suitable manner and is movable into and out of the well between lowered and raised positions. Each of the panels is movable to an open position within the body allowing movement of such a convertible top structure into and out of the well without interfering in any manner with such movement.

When the panels 48 and 50 are in closed position, as shown in full lines in FIGURE 1 of the drawings, it will be noted that the panels fit flush with the adjacent edges of the opening 26 and also fit flush with each other. It will also be noted that the panels provide a continuation of the adjacent body contour when in closed position so that there are no breaks or interruptions in the upper body contour to detract from the aesthetic appearance of the body.

Referring now to FIGURES 1 through 7 of the drawings the panel 48 will be particularly described. Since the panel 48 is supported on the body in the same manner at either side thereof only the supporting means for the right hand side of the panel will be described and it will be understood that the supporting means are the same for the other side of the panel although of different hand. As best seen in FIGURES 2 and 5 of the drawings an offset front mounting bracket 54 has its lower leg bolted at 56 to a threaded block 58 which is welded or otherwise secured to the rear wheel housing 60. The bolts 56 extend through slots 62 in the lower leg of the bracket so that the bracket may be adjusted transversely of the body. A rear mounting bracket 64 has the lower leg thereof bolted at 66 to a threaded block 68 which is also secured to the housing 60. Slots 70 are provided in the leg of the bracket in order that bracket 64 may also be adjusted transversely of the body, either simultaneously or independently of bracket 54. A channeled guide 72 is bolted at 74 and 76 to brackets 54 and 64, respectively, with the bolts 74 and 76 being countersunk within the base wall of the guide so as to be located flush with the surface thereof as can be seen particularly in FIGURES 5 and 6.

As best seen in FIGURES 2, 3 and 4 of the drawings, the panel 48 includes an inner offset reinforcing panel 78 which is secured to the panel 48 by bending the edge portion 80 of panel 48 over a continuous peripheral flange 82 of the reinforcing panel. Referring now particularly to FIGURES 2 and 4 of the drawings a rear panel mounting bracket 84 is secured to the panel 78 by a number of bolts 86 which extend through openings in bracket 84 and panel 78 and thread into a mounting block 88 which is welded or otherwise secured to panel 78. An offset link 90 is pivotally secured at one end thereof at 92 to the depending leg 94 of bracket 84. The other end of the link 90 mounts a roller 96 which is both slidable and pivotal in guide 72. The roller 96 is secured to the leg 90 by means of a countersunk bolt 93 which also swingably mounts a link 95 for a purpose to be hereafter described. As will be noted in FIGURE 2 of the drawings, a pair of pins 97 and 98 are secured to the depending leg 94 of bracket 84 with these pins extending generally outboard of the body, and with link 90 engaging pin 97 when panel 48 is in closed position.

Referring now particularly to FIGURES 2 and 3 of the drawings, a front panel mounting bracket 100 is secured to panel 78 by a number of bolts 102 which extend through openings in bracket 100 and panel 78 and are threaded into a mounting block 104 which is welded or otherwise secured to panel 78. The depending leg 106 of bracket 100 pivotally mounts a roller 108 which is both slidable and pivotal in the guide 72 and is secured to leg 106 by a countersunk bolt 110.

Referring now particularly to FIGURES 1, 2 and 7 of the drawings, the power operating means for the panel 48 will be described. This power operating means generally comprises an electric motor driving a gear box which operates a pair of like racks movable transversely of the body in opposite directions with respect to each other. Each of the racks is secured to a like flexible cable which in turn is secured to one side of the panel 48, as will be described, so as to move the panel 48 between a closed position as shown in full lines in FIGURES 1 and 2 and an open position as shown in dot-dash lines in FIGURE 1 wherein the panel 48 is located below the rear deck 32 of the body. The motor 112 and gear box 114 are preferably secured to one of the rear cross frame members of the body, not shown, although they may be otherwise secured to other chassis structural members or to a body structural member. The output of the gearbox is a pinion gear 116 which meshes with a pair of racks 118 and 120 operating the left and right hand sides, respectively, of panel.

Each of these racks is mounted in a tube 122 of square cross section which is secured to the gearbox 114 and extends therethrough so as to guide the racks during their movement. The tubes 122 are closed throughout their length except for an arcuate cut-out section 124 provided in each so as to allow the racks 118 and 120 to mesh with gear 116. A circular tube 126 is secured to opposite ends of each of the tubes 122 by a suitable bushing 128 and extends toward the sides of the body and then forwardly thereof, with each of the tubes 126 terminating at 130, FIGURE 1. A flexible cable 132 is secured to one end of each of the racks 118 and 120 by inserting an end 134 of the cable within a suitable bore in the rack and thereafter welding or otherwise securing the cable 132 to the rack at 136. Each of the cables 132 extends from the rack through the tube 126 and terminates immediately adjacent the forward end 130 of the tube when panel 48 is in closed position. A rigid rod 140 is secured at one end thereof to the forward end of each cable 132 and at the other end thereof to the link 95 which is pivotally secured to the link 90 as previously described.

When the panel 48 is in closed position as shown in FIGURES 1 and 2 it will be noted that the link 90 is in a generally upright position and engages the pin 97 which is provided on bracket 84 as previously described. The roller 108 is also in engagement with an adjustable stop block 142, FIGURE 2, which fits within guide 72 and is secured thereto by a bolt 144 extending through a slot 146 in the block and threaded into the base wall of the guide. Since the panel 48 is generally co-extensive with the portion 28 of the opening, the panel 48 cannot be moved rearwardly without first lowering the panel since otherwise the panel 48 would engage the forward edge of the rear deck 32 of the body. Thus, if it is desired to move the panel 48 from its closed position as shown in full lines in FIGURES 1 and 2 to its open position as shown in dot-dash lines in FIGURE 1, the electric motor 112 is operated to drive the pinion 116 in a clockwise direction as viewed in FIGURE 7. This will shift rack 120 toward the left hand side of the body and rack 118 toward the right hand side of the body as viewed in FIGURE 1, so as to pull the cables 132 rearwardly of the body. This in turn will shift the rods 140 rearwardly of the body so that the links 90 will be swung counterclockwise or rearwardly about their pivots 92 into engagement with pins 98 to initially lower the rear portion of the panel 48. Thereafter continued rearward pulling of cables 132 will pull the brackets 84 rearwardly to move the panel 48 rearwardly of the body to its open position as shown in dotted lines in FIGURE 1, as the rollers 96 and 108 move within the guides 72. The relationship between the links 90 and pins 98 of bracket 84 when panel 48 is in open position may be seen in FIGURE 15 of the drawings.

When it is desired to move the panel 48 from its open position, as shown in dot-dash lines in FIGURE 1, to its closed position, as shown in full lines in FIGURE 1, the electric motor 112 is operated to drive the pinion 116 in a counterclockwise direction, as viewed in FIGURE 7. This will shift rack 120 toward the right hand side of the body and rack 118 toward the left hand side of the body, as viewed in FIGURE 1, so as to push the cables 132 forwardly of the body. This in turn will shift the rods 140 forwardly of the body so that the panel 48 will move forwardly of the body as the rollers 96 and 108 move forwardly in guides 72. The links 90 will remain in engagement with the pins 98 during this forward movement of the body until the rollers 108 come into engagement with the stop blocks 142 at the forward ends of each of the guides 72. Thereafter, as the rods 140 continue to shift forwardly of the body, the links 90 will be swung clockwise or forwardly of the body about their pivots 92 into engagement with the pins 97 to raise the rear portion of panel 48. Thus, the panel 48 will be moved to its closed position. The friction between the gears of the gear box 114 and between the output pinion 116 of the gear box and each of the racks 118 and 120 prevents the cables 132 from being shifted forwardly or rearwardly of the body when the panel 48 is in either open or closed positions. Thus, the cables 132 and the rods 140 serve to maintain the links 90 in engagement with either the pins 98 or 97 so as to prevent any movement of the panel 48 when it is in either open or closed position.

Figure 9:
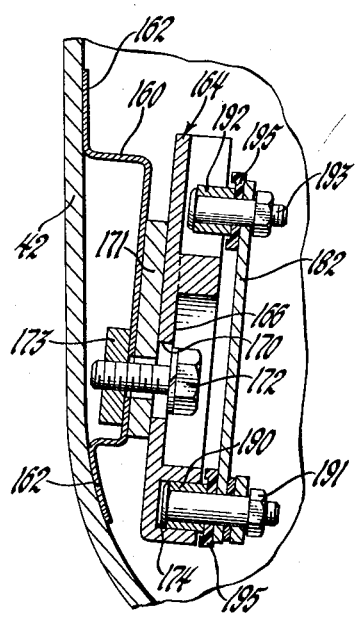
FIGURE 9 is a sectional view taken on the plane indicated by line 9—9 of FIGURE 8.

Referring now particularly to FIGURES 1 and 8 through 12, the right hand panel or section 50 will be described. Before proceeding with this description it will be understood, of course, that the left hand panel 50 is the same although of different hand. As best seen in FIGURES 8 and 9 an offset mounting plate 160 has opposite flanged edges 162 thereof secured to the portion 42 of wall 40. The front guide channel assembly 164 includes an inset web 166 and an inset tongue 168 each of which is slotted at 170. A bolt 172 extends through each of the slots 170 and through enlarged openings in a shim 171 and plate 160 and is threaded into a mounting block 173 which is welded or otherwise secured to the mounting plate 160. The assembly 164 includes a generally vertical guide track 174, the lower end 175 of which curves generally outboard of the body and a generally irregular arcuate guide track 176. As best shown in FIGURES 8 and 10 the panel 50 includes an embossed reinforcing panel 52 which is secured to panel 50 by flanging the edge portion 178 of panel 50 over a peripheral flange 180 of panel 52. An angular front mounting bracket 182 has a leg 184 thereof secured to the panel 52 by a number of bolts 186 which extend through leg 184 and panel 52 and are threaded into a mounting block 188 which is welded or otherwise secured to panel 52. The other leg of bracket 182 pivotally mounts a pair of rollers 190 and 192 which are both pivotal and slidable in channels 174, 176, respectively. The rollers are secured to bracket 182 by studs 191 and 193, respectively, with washers 195 being provided between the rollers and the bracket.

Referring now particularly to FIGURES 10 and 11 an angular rear mounting bracket 194 has one leg 196 thereof secured to the wall 40 adjacent juncture of this wall with the wall 30 which spans the body at the rear of the rear seat 24. A rear guide track 198 is secured to the other leg of bracket 194 by a pair of studs 200 which are secured to the base wall of track 198 and are bolted to the bracket 194. As can be seen in FIGURE 11, slots are provided in the bracket 194 so that the guide track can be adjusted inboard and outboard of the body with respect to the bracket. It will further be noted that the lower end 202 of the track 198 curves generally outboard of the body. A bracket 204 has a leg 206 thereof secured to the reinforcing panel 52 by a number of bolts 208 which extend through the leg 206 of bracket 204 and through panel 52 and are threaded into a block 210 which has welded or otherwise secured to panel 52. The other leg of bracket 304 mounts a roller 212 at 214 which is both pivotal and slidable in the track 198. The pivot 214 also mounts a link 216 which is secured to a rod 218 for a purpose to be hereinafter described.

Referring now particularly to FIGURES 1, 13 and 14 the power operating means for each of the side panels 50 will now be described. The power operating means generally includes an electric motor 220 which drives into a gearbox 222 having an output pinion 224. The motor and gearbox are preferably secured to the body floor pan underneath the seat back 226 of the rear seat 24. A pair of square tubes 228 extend through the gearbox 222 and slidably mount a pair of racks 230 and 231. Each of the racks meshes with the output pinion 224 of the gear box as best shown in FIGURE 13, with each of the tubes 228 being provided with an arcuate cut-out 232 for this purpose.

A rectangularly shaped block 236 which is provided with a central square shaped opening 238 is welded or otherwise secured at 240 to one end of each of the tubes 228. A generally rectangularly shaped sheet metal housing 244 is bolted at 246 at one end thereof to each of the blocks 236. A pair of tubes 248 are mounted on opposite sides of the housing 244 and each is provided with a slot 250 which extends the full length of the tube. A reduced end of each of the tubes is freely received within a circular bore 251 in block 236 to locate this one end of each of the tubes. A guide block 252 is slidably mounted within housing 244 intermediate the tubes 248 and is welded or otherwise secured at 254 at one end thereof to one end of each of the racks 230 and 231. The other end of block 252 is slotted at 256 and a pair of plates 258 are received within this slot and are secured to the opposite legs defining the slot by adjusting screws 259. The other ends of the plates 258 project through the slots 250 in tubes 248 and are received within slots 260 provided in one end of a pair of cables 262 and 264, with the plates and cables being secured together as by welding or otherwise. A pair of tubes 268 and 270 have one end fitting within bores 272 in a rectangularly shaped block 274 which extends between the walls 276 of housing 244 and is secured thereto as by a bolt 280. The bores 272 receive the other reduced ends of tubes 248 in order to accurately locate these other ends of the tubes. As best shown in FIGURES 13 and 14 a pair of slots 282 are provided in each of the opposite side walls 276 of housing 244 in order that the adjusting screws 259 may be inserted and removed in order to assemble and disassemble the plates 258 from block 252.

The tubes 268 and 270 extend to the sides of the rear seat 24, with tubes 268 then extending upwardly at the sides of the seat and terminating at 284, FIGURE 10, and with tubes 270 then extending forwardly to adjacent the wall portions 42 of walls 40 and then upwardly and terminating immediately below the lower ends 175 of tracks 174. The cables 262 and 264 extend through the tubes, with cables 262 being secured at their forward ends to the lower ends of rods 218 in a manner to be described, and with cables 264 being secured at their forward ends, in the same manner as cables 262, to similar rods 286 which is secured to links 288 swingably mounted on the studs 191. Referring now particularly to FIGURES 10 and 12, the manner in which cables 262 are secured to rods 218 will be described, and it will be understood that cables 264 are secured in the same manner to rods 286. Cables 262 terminate in a tongue 290 which is received within a slot 292 provided in a threaded clevis member 294. The clevis member is threaded into a threaded bore 296 provided in the lower end of rod 218.

When it is desired to move the panels 50 from their closed position, as shown in full lines in FIGURE 1, to open position as shown in dot-dash lines in FIGURE 1, motor 220 is operated to drive the pinion 224 in a clockwise direction, as viewed in FIGURE 13. This will shift racks 230 to the left hand side of the body and racks 231 toward the right hand side of the body, as viewed in FIGURE 1, so as to shift block 252 toward the center of the body and pull the cables 262 and 264 rearwardly. As the cables are pulled rearwardly of the body, the rods 218 and 286 are shifted downwardly. As rods 218 shift downwardly, they will pull rollers 212 downwardly within the guide tracks 198, but this movement of the rollers within the guide track will not in any manner control tilting or swinging movement of the panels 50 either inboard or outboard of the body since the entire tilting or swinging movement of the panels 50 is controlled by the forward guide track assembly 164.

Downward shifting movement of rods 286 will cause rollers 190 to move downwardly within the guide tracks 174 as rollers 192 initially remain substantially stationary in the guide tracks 176 or move slightly toward the upper ends of the guide tracks. However, as rollers 190 continue to move downwardly within the guide track 174, rollers 192 will start to move downwardly within guide tracks 176 so that the panels 50 start to swing inboard of the body toward a generally upright position. Thereafter, as the rollers move downwardly within the tracks 174 and 176 to their position shown in dot-dash lines in FIGURE 8, the panels 50 swing to a generally upright position immediately adjacent the walls 40, with the ends 175 of guide tracks 174 causing the inboard edge portions of panels 50 to be shifted slightly outboard of the body immediately before the panels reach their fully open position.

If it is desired to move the panels 50 from their open position, as shown in dot-dash lines in FIGURE 1, to their closed position, as shown in full lines in FIGURE 1, motor 220 is operated in a reverse direction to rotate pinion 220 counterclockwise, as viewed in FIGURE 13, so as to shift rack 230 toward the right hand side of the body and rack 231 toward the left hand side of the body, as viewed in FIGURE 1. This will shift the cables 262 and 264 generally forwardly of the body so as to shift rods 218 and 286 upwardly and thereby move the panels 50 to their closed position.

Although not shown in the drawings, it will be understood, of course, that the motors 112 and 220 may be interconnected in a suitable electrical circuit which includes the battery of the vehicle or an auxiliary source of power whereby the motors may be operated either selectively or simultaneously so as to sequentially move the panels between open and closed positions or simultaneously move the panels between these positions.

Thus, this invention provides a new and improved convertible top well closure which includes a plurality of generally rigid panels movable between open and closed positions to open and close the opening of the top well. The panels are stored within the body when not in use and do not interfere in any manner with movement of the convertible top structure into and out of the top well. Since the panels are power operated, the driver or operator need not leave his seat each time the convertible top is raised and lowered. Additionally, since the panels continue the adjacent general contour of the upper body surface without any bulges or interruptions, the aesthetic appearance of the vehicle is substantially increased.

What is claimed is:

1. The combination comprising, a vehicle body rear deck panel having a top well opening therein, a closure adapted to fit within said opening in the closed position thereof and having forward and rearward edge portions located in adjacent flush relationship with respective edge portions of said panel, said closure being movable rearwardly to a lowered open position below said panel out of registry with said opening, a guide member within said body and extending below said opening, first roller means pivotally secured to said closure adjacent the forward edge portion thereof and movable within said guide member, a link swingably secured to said closure adjacent the rearward edge portion thereof for swinging movement between a generally upright position and a generally horizontal rearwardly directed position to thereby raise and lower said rearward edge portion of said closure into and out of adjacent flush relationship with said rearward edge portion of said panel, second roller means pivotally secured to said link and movable within said guide member, stop means mounted on said guide member for engagement by said first roller means when said panel is moved from open to closed position to locate said forward edge portion of said closure in adjacent flush relationship with the said forward edge portion of said panel, and power operating means secured to said link for moving said closure between said open and closed positions thereof, said operating means being adapted to move said closure from an open position to a partially closed position wherein said first roller engages said stop means whereby continued operation of said operating means will swing said link from said generally horizontal position thereof to said generally upright position thereof to thereby raise said rearward portion of said closure into adjacent flush relationship with said rearward edge portion of said panel.

2. The combination comprising, a vehicle body having a panel provided with an opening therein, a closure adapted to fit within said opening in the closed generally horizontal position thereof and being movable to a lowered generally upright open position to one side of said opening, generally vertically disposed first guide means on said body extending below said opening, first roller means pivotally secured to said closure adjacent an edge portion thereof and movable within said guide means, generally vertically disposed second arcuate guide means on said body extending below said opening and having a portion adjacent to and in substantially parallel relationship with said first guide means, second roller means pivotally secured to said closure adjacent said edge portion thereof in spaced relationship to said first roller means, said second roller means being movable within said second guide means, generally vertically disposed third guide means on said body extending below said opening in spaced relationship with said first and second guide means, third roller means pivotally secured to said closure adjacent an edge remote from said first and second roller means and movable within said third guide means, and operating means secured to said closure adjacent said first and third roller means for moving said closure between said open and closed positions thereof to move said roller means along said guide means.

References Cited in the file of this patent
UNITED STATES PATENTS

| | | |
|---|---|---|
| 1,415,332 | Gebhard | May 9, 1922 |
| 2,185,581 | Bessonneau | Jan. 2, 1940 |
| 2,686,076 | Helser | Aug. 10, 1954 |
| 2,733,954 | Blake | Feb. 7, 1956 |
| 2,747,921 | Hooverson | May 29, 1956 |
| 2,747,928 | Olivier et al. | May 29, 1956 |
| 2,785,922 | Chika | Mar. 19, 1957 |
| 2,800,361 | Kubacka | July 23, 1957 |
| 2,869,923 | Mulichak | Jan. 20, 1959 |